Dec. 22, 1942.   W. E. GERMER   2,305,769
BOILER EFFICIENCY METER
Filed Feb. 28, 1941

INVENTOR.
Wilhelm E. Germer
BY
Dawson Ooms & Booth
ATTYS.

Patented Dec. 22, 1942

2,305,769

UNITED STATES PATENT OFFICE 2,305,769

BOILER EFFICIENCY METER

Wilhelm E. Germer, Berlin-Charlottenburg, Germany; vested in the Alien Property Custodian Application February 28, 1941, Serial No. 381,048

6 Claims. (Cl. 73—193)

This invention relates to the practical construction of an electric indicating or recording instrument which indicates continually the overall efficiency of the combustion obtained in any kind of heat exchanger.

The method of obtaining the efficiency is based on my prior applications Serial No. 227,136 of August 27, 1938, now matured into Patent No. 2,252,367, and Serial No. 261,027 of March 10, 1939, now matured into Patent No. 2,252,369, in which the boiler efficiency is determined by measuring the quotient of the heat contained in the flue gases divided by the heat used for the production of the steam. In a similar manner the overall efficiency of any kind of heat exchanger operated by combustion can be determined and indicated, as for instance for air heaters or for a heating apparatus operating with hot water with forced circulation. For the determination of the overall efficiency of such heat exchangers it is only necessary to measure the quotient of the heat contained in the flue gases and to divide it by the useful heat output, while the fixed relation of the value of this quotient to the overall efficiency is indicated on the scale of the instrument for which the relations are as follows:

If $\eta$ designates in per cent the overall efficiency obtained in the heat exchanger during combustion, $E_1$ in kcal./s. the heat contained in the flue gases, $E_2$ in kcal./s. the useful heat output and $a$ in per cent the constant losses from combustion, due to radiation, conductivity and refuse losses, the efficiency as described more in detail in my Patent No. 2,252,367 will be obtained from the relation:

$$\eta = \frac{100-a}{1+\frac{E_1}{E_2}} = \frac{100-a}{1+x}$$

where $$x = \frac{E_1}{E_2} = \frac{\text{flue gas heat}}{\text{useful heat output}}$$

represents the quotient to be measured.

The efficiency of any heat exchanger operated by combustion can thus be determined by measuring the quotient $x$. As the efficiency is definitely fixed at the existence of a certain flue gas heat and certain useful heat, the efficiency can also be indicated as function of the reverse value of the quotient, that is as a function of the value $$\frac{1}{x} = \frac{\text{useful heat output}}{\text{flue gas heat}}$$

This has the practical advantage to give a more uniform scale division. It is therefore possible to indicate the efficiency as well with the quotient $x$ as with its reverse value the quotient $$\frac{1}{x}$$

If the following description refers mainly to the measurement of the quotient $x$ it is to be understood, that the same measures may be taken for the measurement of the reverse quotient $$\frac{1}{x}$$

The practical application of measuring the flue gas heat $E_1$ requires the measuring of the flue gas flow and the multiplication of the same with the actual difference in temperature between the flue gas and the cold air used for combustion. The useful heat output of steam boilers can be obtained directly, as described in my prior application Serial No. 227,176, by measuring the steam quantity of the superheated steam with an ordinary steam flow meter of differential pressure type without correction of temperature changes. For air heaters and hot water heating apparatus with forced circulation the useful heat is determined by measuring the flow of the air or of the water and by multiplying it with the difference in temperature between the outlet and the inlet flow.

In my application Serial No. 227,136 I have used as approximation a constant mean value for the temperature of the air used for combustion. As changes in air temperature exert a small but noticeable influence on the efficiency, and as the present invention represents a new practical construction for the introduction of the difference in temperature between the flue gas and the air used for combustion, it is one of the objects of my invention to provide a practical construction of an efficiency meter in which the flue gas heat is measured as product of the flue gas flow and the difference of temperature between the flue gas and air respectively.

Another object of the invention is to provide a practical construction for the efficiency meter by using an electric quotient meter, with two separate measuring coils, one of which measures the heat of the flue gases and the other measures the useful heat as the product of the flow of water, steam or air multiplied by its difference in temperature between outlet and inlet flow, while the function between the quotient of the flue gas heat divided by the useful absorbed heat and the overall efficiency is expressed directly on the scale of the instrument. Other objects, advantages and novel features of the invention will appear as the description proceeds. The division of two values individually measured for instance by two separate rheostats moved by flow meters can be obtained directly by a quotient meter so that the current is led from an electric source of supply over two branches of the circuit which contain each one of the variable resistances of the two rheostats and one of the two coils of the quotient meter.

A suitable apparatus for carrying out the method of efficiency indication is illustrated in the accompanying drawing, in which Fig. 1 shows the known connection of a quotient meter in which the current feeds directly the variable resistances of two rheostats and then flows through two circuit branches each one containing one of the rheostats and one of the two measuring coils of the quotient meter.

Figure 1:
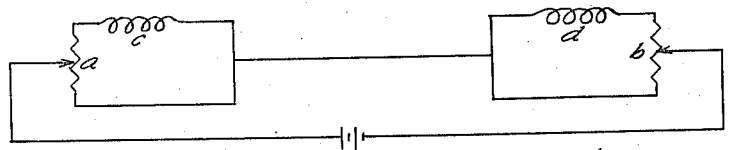

Fig. 1 shows the connection of a quotient meter, in which the full current flows directly to the variable resistances of two rheostats $a$ and $b$ and thence to two circuit branches, which contain in addition each a coil $c$ and $d$ respectively of the quotient meter. The two measuring coils $c$ and $d$ of the quotient meter may be the coils of a quotient meter with T-coil measuring system. If the two rheostats are moved directly by two mechanical flow meters measuring the flow of flue gas and the flow of steam respectively, the quotient of the flue gas flow divided by the steam flow is directly obtained by the deflection of the pointer of the quotient meter instrument.

In order to obtain the quotient of flue gas heat divided by useful heat the additional multiplication of the single flows by the difference in temperature between outlet and inlet flow is necessary. With this object in view a bridge connection is inserted in each circuit branch of the flows in which the inlet and outlet temperatures are introduced as electric resistance thermometers of the respective flows in adjacent branches of the bridge. A current proportional to the product of flow times its difference in temperature flows then through each of the coils of the quotient meter.

Figure 2:
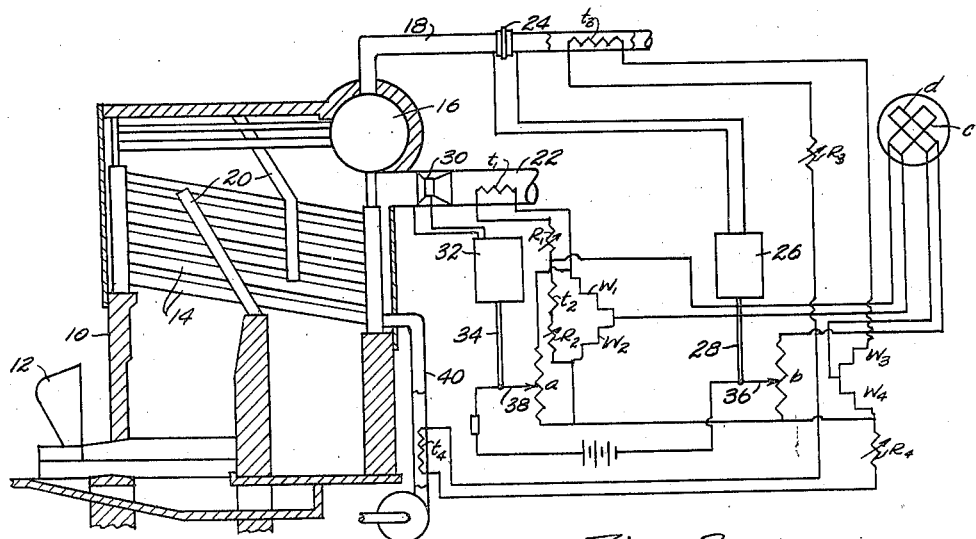
Fig. 2 shows the application of the quotient meter to a steam boiler for indicating directly the boiler efficiency by insertion of a bridge connection with two resistance thermometers in each of the two circuit branches containing each in addition one rheostat of the flow meters and one measuring coil of the quotient meter.

Figure 2 illustrates a connection of my quotient meter to a steam boiler and shows one of the many possible electrical hook-ups which may be used according to the invention for such a quotient meter. As shown, the boiler, indicated generally at 10, is supplied with fuel by a stoker 12, although it is to be understood that any suitable fuel supply means could be employed. The boiler includes a plurality of water tubes 14 connected to a header or drum 16, from which a steam pipe 18 leads to any desired steam consuming apparatus. Baffles 20 divide the boiler into several passes, terminating in a flue 22 connected to a suitable stack or the like. While one particular form of boiler has been illustrated, it will be understood that this is not material to the invention, but that the invention might be utilized with other types of boilers or other types of heat exchange apparatus.

In order to measure the steam flow from the boiler, an orifice 24 is placed in the pipe 18 and has its opposite sides connected to a steam flow meter 26, which may be of any desired type. The meter 26 is connected to a rod 28 to move it vertically in proportion to variations in steam flow. The meter 26 is preferably not compensated for temperature, so that it automatically compensates for super heat, and so that the rod 28 is moved proportionally to variations in the quantity of heat flowing from the boiler in the steam. Flue gas flow is measured by a venturi 30 mounted in the flue 22 and having connections from its inlet side and its throat to a flow meter 32. The flow meter 32 moves a rod 34 vertically proportional to variations in the flow of flue gas through the flue.

The rod 28 is connected to a wiper 36, moving over the rheostat $b$, and a rod 34 is similarly connected to a wiper 38 moving over the rheostat $a$. Both rheostats $a$ and $b$ form parts of a circuit branch, each of which contains a Wheatstone bridge. Variable resistances $t_1$ and $t_2$ of the bridge are resistance thermometers responsive respectively to flue and air temperatures, and are adapted to vary their resistance in accordance with variations in the surrounding temperature. The resistance $t_1$ is mounted in the flue 22 to be responsive to the temperature of the gas flowing therethrough, while the resistance $t_2$ may be mounted in any convenient place so as to be responsive to the air surrounding the boiler. The resistances $t_3$ and $t_4$ of the other bridge are similar resistance thermometers, responsive respectively to the outlet and inlet temperature of the useful heat. As shown, the resistance $t_3$ is arranged in the steam pipe 18, and the resistance $t_4$ is mounted in the feed water pipe 40 for the boiler. The resistances $W_1$, $W_2$, $W_3$, $W_4$ are ordinary fixed bridge resistances. The resistances $R_1$, $R_2$, $R_3$, $R_4$ are in a series respectively with the variable resistances and serve for adjustment of the different values of these small resistances.

The current flowing in the first bridge diagonal is carried to one of the two measuring coils $c$ of a T-coil measuring system and the flow in the second bridge diagonal is led to the second coil $d$ of the T-coil meter. The T-coil meter measures then continually the quotient of flue gas heat divided by useful heat while the scale of the instrument indicates directly the overall efficiency of the heat transformer.

In applying the method for determining boiler efficiency according to my Patent No. 2,252,367 changes in steam pressure may be compensated at the flow measurement by equipping the steam flow meter with an automatic equipment for pressure correction. As the total correction is proportional to the flow, this correction requires a continuous multiplication with the respective movement of the flow meter pointer and in consequence thereof a complicated construction of the correcting equipment. It is therefore a further object of this invention to simply effect this correction by an electric rheostat, operated by an ordinary steam manometer, this rheostat being inserted directly in the measuring current for the quotient meter.

The quotient meter measures continually the value of the quotient $x$ of flue gas heat divided by the useful heat. The scale of this quotient meter has no actual zero point, but only a small range of measurement for instance of 0.20 on a scale ranging from 0.10–0.30. In this case the scale begins with the quotient $x_{max}=0.30$ and ends with the quotient $x_{min}=0.10$. The ratio of the quotient meter is then $0.10:0.30=1:3$. The pointer of the quotient meter makes movements absolutely proportional to the value of the quotient $x$. If the scale of the quotient meter were equipped with divisions for $x$-values, these would be entirely uniform over the whole scale. A certain movement of the pointer to the right would then cause a uniform decrease of all readings on such a scale. A change in reading of the pointer indication due to a definite motion of the pointer to the one or the other side signifies therefore a uniform decrease or increase of the value of the quotient. Such a change in reading is perfectly independent on the boiler load or on the steam flow and can be considered as a multiplication of the $x$-values. As the correction required for changes in steam pressure is only small and rarely more than 15%, it is admissible, to base the required pointer motion on the middle position of the scale. The error which is introduced hereby at other points of the scale is only small, as the scale does not begin at the zero point, so that the deviations are only small with respect to the total value and as only an error of a small correction value has to be accepted.

Figure 3:
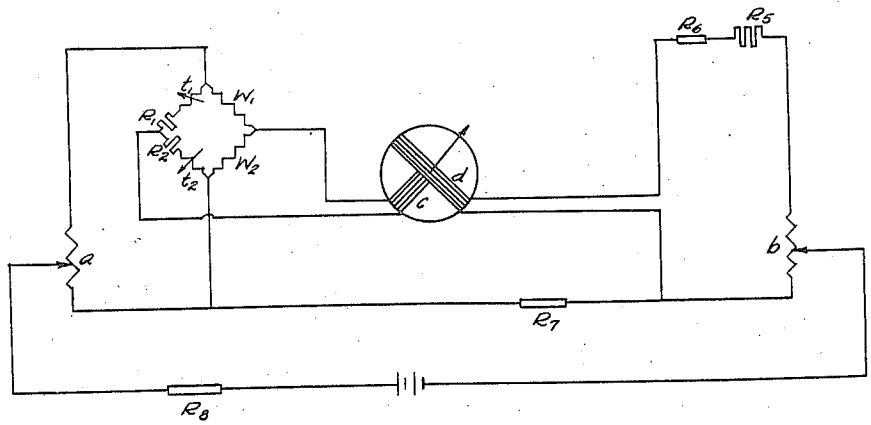
Fig. 3 shows an electric quotient meter as applied for continuous indication of the boiler efficiency using an ordinary steam flow meter without correction for changes in steam temperature to move the rheostat for the steam flow and a steam pressure manometer with an electric rheostat to compensate the effect of changes in steam pressure on the measurement of the absorbed heat in the steam.

Fig. 3 shows a special circuit-arrangement of a quotient meter indicating continuously the boiler efficiency. The current of an electric source of supply feeds the two rheostats $a$ and $b$ of a flue gas flow and a stream flow meter respectively. The bridge in the circuit branch of the rheostat $a$ for the flue gas flow contains again the two thermometers $t_1$ and $t_2$ for the measurement of the flue gas heat. The rheostat $b$ is moved by a steam flow meter having no correction for changes in steam temperature. This circuit branch of which rheostat $b$ forms a part has no bridge arrangement, as changes in steam temperature are compensated by the errors of the steam flow meter. The effect of changes in steam pressure on the measurement of the absorbed heat are compensated by a steam pressure manometer, not shown here, which controls, however, the resistance of rheostat $R_5$. The resistances $R_6$ and $R_7$ serve to balance the instrument and to adjust the correct motion of the pointer. $c$ and $d$ again are the two coils of the quotient meter. A change in the resistance $R_5$ causes a change in the pointer position and effects thereby the required correction for the change in steam pressure.

A further feature of the invention consists in the practical application of this correction for changes in steam pressure. According to the invention it is immaterial whether the change occurs for saturated steam, or for superheated steam with constant temperature or with an additional change in temperature. In all these three instances the same correction can be applied, as in spite of different values required for the pressure correction for the steam flow meter these deviations are compensated in all these instances by changes in the absorbed heat of the steam, if a steam flow meter without correcting equipment for changes in steam temperature is used. The resistance $R_5$ in Fig. 3 can consequently always be moved by a steam manometer, which measures the pressure of the steam just before the steam flow meter. While several embodiments of the invention have been described, it will be apparent that many changes might be made therein or that the character of the invention might be carried out in many different ways. It is accordingly not intended to limit the invention to the exact forms nor otherwise than by the terms of the appended claims.

What is claimed is:

1. An efficiency meter for a heating plant operated by combustion of air and fuel and imparting heat to an output fluid comprising means for measuring flue gas flow from the heating plant, means for measuring the temperature of the flue gas, means for measuring the temperature of the air used for combustion, means for multiplying the flue gas flow by the difference in said temperatures to obtain the value of the heat in the flue gas, means for measuring the value of the useful heat flowing from the heating plant in the output fluid, and means for dividing one of said values by the other to obtain a quotient indicative of the efficiency of the heating plant.

2. An efficiency meter for a heating plant operated by combustion of air and fuel and imparting heat to an output fluid comprising means for measuring flue gas flow from the heating plant, means for measuring the temperature of the flue gas, means for measuring the temperature of the air used for combustion, means for multiplying the flue gas flow by the difference in said temperatures to obtain the value of the heat in the flue gas, means for measuring the flow of output fluid from the heating plant, means for measuring the temperatures of the output fluid at its inlet to and outlet from the heating plant, means for multiplying the output fluid flow by the difference in the output fluid temperatures to obtain the value of useful heat in the output fluid, and means for dividing one of said values by the other to obtain a quotient indicative of the efficiency of the heating plant.

3. An efficiency meter for a heating plant operated by combustion of air and fuel and imparting heat to an output fluid comprising means for measuring flue gas flow from the heating plant, means for measuring the temperature of the flue gas, means for measuring the temperature of the air used for combustion, means for multiplying the flue gas flow by the difference in said temperatures to obtain the value of the heat in the flue gas, means for measuring the flow of output fluid from the heating plant, means for measuring the pressure of the output fluid, means for combining the flow and pressure measurements of the output fluid to obtain the value of useful heat in the output fluid, and means for dividing one of said values by the other to obtain a quotient indicative of the efficiency of the heating plant.

4. An efficiency meter for a heating plant operated by combustion of fuel and air and imparting heat to an output fluid comprising an electric circuit, a pair of rheostats in said circuit, one operated in accordance with the rate of flow of flue gas from the heating plant and the other in accordance with the rate of flow of output fluid from the heating plant, a branch circuit connected to said one of the rheostats and having a Wheatstone bridge therein, said Wheatstone bridge including two resistances adjusted respectively in accordance with the temperature of the air for combustion and with the flue gas temperature, a quotient meter having two coils, circuits connecting one of the coils across the Wheatstone bridge, and a circuit connected to the other coil and to the other of said rheostats.

5. An efficiency meter for a heating plant operated by combustion of fuel and air and imparting heat to an output fluid comprising an electric circuit, a pair of rheostats in said circuit, one operated in accordance with the rate of flow of flue gas from the heating plant and the other in accordance with the rate of flow of output fluid from the heating plant, a branch circuit connected to said one of the rheostats and having a Wheatstone bridge therein, said Wheatstone bridge including two resistances adjusted respectively in accordance with the temperature of the air for combustion and with the flue gas temperature, a branch circuit connected to the other of said rheostats and having a second Wheatstone bridge therein, said second Wheatstone bridge including two resistances adjusted respectively in accordance with the inlet and outlet temperatures of the output fluid, and a quotient meter having two coils connected respectively across said Wheatstone bridges.

6. An efficiency meter for a heating plant operated by combustion of fuel and air and imparting heat to an output fluid comprising an electric circuit, a pair of rheostats in said circuit, one operated in accordance with the rate of flow of flue gas from the heating plant and the other in accordance with the rate of flow of output fluid from the heating plant, a branch circuit connected to said one of the rheostats and having a Wheatstone bridge therein, said Wheatstone bridge including two resistances adjusted respectively in accordance with the temperature of the air for combustion and with the flue gas temperature, a second branch circuit connected to the other of said rheostats, a resistance in said second branch circuit adjustable in accordance with the pressure of the output fluid, and a quotient meter having two coils connected respectively across the Wheatstone bridge and in the second branch circuit.

WILHELM E. GERMER.